United States Patent [19]

Boals

[11] Patent Number: 4,607,615
[45] Date of Patent: Aug. 26, 1986

[54] AUTOMATIC CONTROL SYSTEM FOR WATER HEATERS

[76] Inventor: Wayne S. Boals, P.O. Box 1289, Blue Jay, Calif. 92317

[21] Appl. No.: 717,366

[22] Filed: Mar. 28, 1985

[51] Int. Cl.$^4$ ............................................. F24H 1/00
[52] U.S. Cl. ..................................... 126/362; 137/334; 137/560
[58] Field of Search ................. 126/362; 137/87, 334, 137/560; 219/287, 296, 297, 309, 310, 312

[56] References Cited

U.S. PATENT DOCUMENTS

| | | | |
|---|---|---|---|
| 1,876,938 | 9/1932 | Horne | 137/510 |
| 2,283,513 | 5/1942 | Smith | 137/510 |
| 3,413,969 | 12/1968 | Whittell | 126/362 |
| 3,754,563 | 8/1973 | Boals | 126/362 |

*Primary Examiner*—Samuel Scott
*Assistant Examiner*—Noah Kamen
*Attorney, Agent, or Firm*—Nilsson, Robbins, Dalgarn, Berliner, Carson & Wurst

[57] ABSTRACT

A system for isolating a pressurized water source from a pressurized hot water tank when a leak or rupture occurs to the tank. The system includes a connecting line attached between a check valve and a control valve with a diaphragm attached to the control valve body to sense the pressure differential between the water source and the connecting line. Upon a leak or a rupture occurring, the diaphragm completely closes the control valve. The check valve does not allow the hot water from the water heater tank to enter the domestic system when a leak or rupture occurs. The system further allowing cold water to enter the tank when a predetermined temperature is reached or exceeded. The system further allowing for make up of water volume loss in the tank during a cooling cycle.

16 Claims, 5 Drawing Figures

AUTOMATIC CONTROL SYSTEM FOR WATER HEATERS

BACKGROUND OF THE INVENTION

1. Field of the Invention

The present invention generally relates to isolating a pressurized hot water heater tank from a pressurized water source system and, more particularly, is concerned with completely closing a control valve disposed between the water source and the hot water tank. A diaphragm attached to the control valve senses the pressure differential between the water source and the pressure in the connecting line which allows communication between the control valve and a check valve. The check valve controls the water flow from the hot water tank to the hot water domestic system or the household user.

2. Description of the Prior Art

Almost all buildings have hot water heaters in various forms. Conventionally, the heaters are connected from a pressurized supply line which contains cold water to the domestic hot water system. Usually, hot water heaters include a storage tank that is heated by a source of energy, for example, natural gas or electricity, which is controlled by a thermostat or the like.

Hot water heaters usually require little or no maintenance. However, due to the mineral contents of the water the interior of the tank often corrodes which weakens the structure of the heater tank. A leak or rupture usually occurs due to the weakened tank structure. The amount of water loss may vary due to various reasons such as the size of the leak. Furthermore, in the event that the temperature within the heater tank becomes excessive, the pressure within the heater becomes excessive, which could lead to a rupture.

To minimize the amount of water loss, various systems have been proposed in the past for isolating the source system when a leak or rupture occurs. For example, in U.S Pat. No. 3,063,432 to Bond, a can is disposed beneath the water heater. When a leak occurs the water would be collected in the can which would activate a switch. This opens a circuit causing the fuel supply and water supply to be cut off.

A similar apparatus is disclosed in U.S. Pat. No. 2,724,401 to Page. Various other structures have been proposed but have not been very economical.

A significant improvement for isolating the hot water heater tank from the source system was disclosed in U.S. Pat. No. 3,754,563 to Boals. The patent describes a valve controlling the flow between the source system and the hot water tank. The valve would be controlled by a diaphragm sensing the pressure differential between the domestic system and the heater tank. The apparatus disclosed by Boals works quite well in most applications but incorporates numerous seals which, under some operating conditions, could deteriorate. Furthermore, the Boals U.S. Pat. No. 3,754,563 apparatus does not provide for the passage of cold water into the hot water heater when an excessive temperature is reached.

SUMMARY OF THE INVENTION

A system for allowing the passage of water from a water source system to a hot water tank in normal use, however, isolating the water source from the hot water tank when a leak or rupture occurs and which also provides for the allowance of water flow into the hot water tank when a predetermined temperature is exceeded.

DETAILED DESCRIPTION OF THE PREFERRED EMBODIMENT

Figure 1:
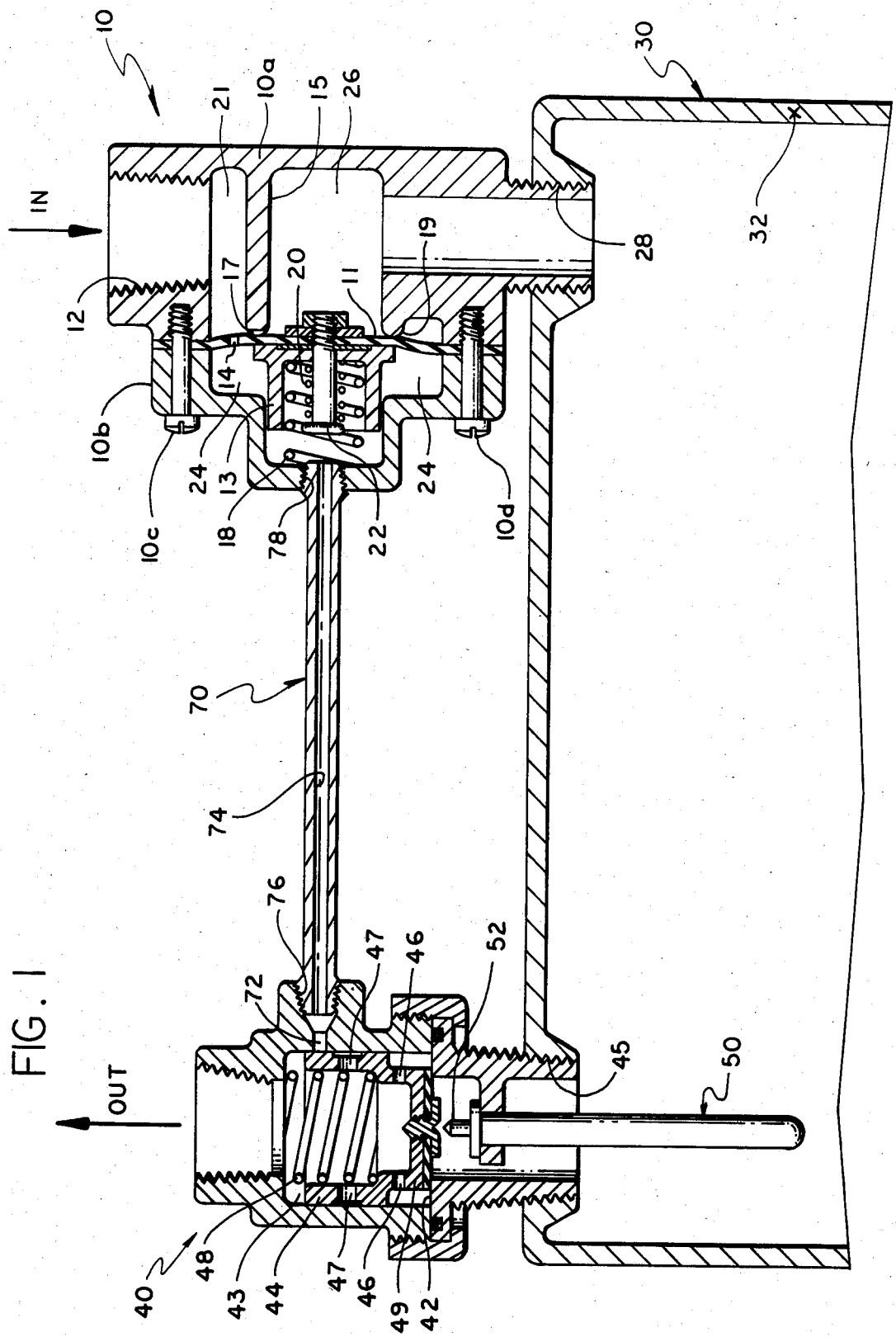
FIG. 1 is a schematic view in cross section of one embodiment of the present invention illustrating the control valve and check valve in the closed position.

The present invention is an improvement of automatic control systems for water heaters. The present invention allows the replacement of the water volume loss in the heater tank during a water cooling cycle. The apparatus disclosed in the prior art patent to Boals utilizes the tank pressure to open the control valve. However, the present invention uses the supply pressure to open the control valve. The present invention will permit cold water to enter the heater tank when a predetermined temperature in the heater tank is reached. The present invention also prevents hot water from exiting the heater tank when a leak or a rupture occurs. A particular application for a system constructed in accordance with the present invention is for a domestic hot water system. For example, if a significant leak or rupture occured in a water tank, the amount of water discharged could be significant. Therefore, a system which would isolate the water source from the hot water tank would be desired. For example, if a significant leak or rupture occurred in the water tank and the water source was isolated from the tank, only a limited amount of water would be available to the household users. Additionally, if the system provided for the prevention of any water exiting from the tank when the leak occurred, a household user upon opening his faucet would immediately know a rupture or leak had occurred in the tank. The household user could then call a plumber to replace the damaged water tank. If the temperature in the water tank exceeds a certain level, the pressure within the tank could cause an excessive stress to the water tank structure resulting in damage to the tank including a rupture. Therefore, it is desired that when a predetermined temperature is reached, cold water is permitted into the tank thereby lowering the temperature.

The present invention provides a system which prevents water from the water source from entering the hot water heater tank when a leak or a rupture occurs to the tank. A control valve connects the cold water source system to the hot water tank, and a check valve connects the hot water tank to the domestic hot water system. A connecting line is used to allow communication between the check valve and the control valve. The control valve includes a diaphragm attached to a valve body and engages a valve seat when the control valve is closed. The diaphragm further includes a restriction orifice to equalize the pressure on both sides of the diaphragm over time. The check valve also includes a valve body having a valve stem which contains openings to let the water flow from the hot water tank to the domestic system. The control valve seat further defines a chamber whose pressure is equal to the hot water tank's pressure. Assuming the pressure on both sides of the diaphragm is equal, when a leak or rupture occurs within the tank, the pressure in the tank drops to ambient pressure. Therefore, the pressure within the chamber defined by the control valve seat and the diaphragm also drops to ambient pressure. This drop in pressure in conjunction with appropriate provisions in the check valve and/or the control valve thereby prevents the control valve from opening; therefore isolating the cold water source from the hot water tank. When the household user's outlet or faucet is closed, the check valve is closed and the communication between the check valve and control valve is closed. If the household user opens his faucet after the leak has occurred in the tank, the pressure drop in the check valve is not communicated to the control valve. Therefore, the control valve will remain closed isolating the cold water from the hot water tank. Furthermore, since the pressure in the tank has dropped to ambient, the check valve will remain closed thereby preventing the hot water from exiting the tank.

Figure 2:
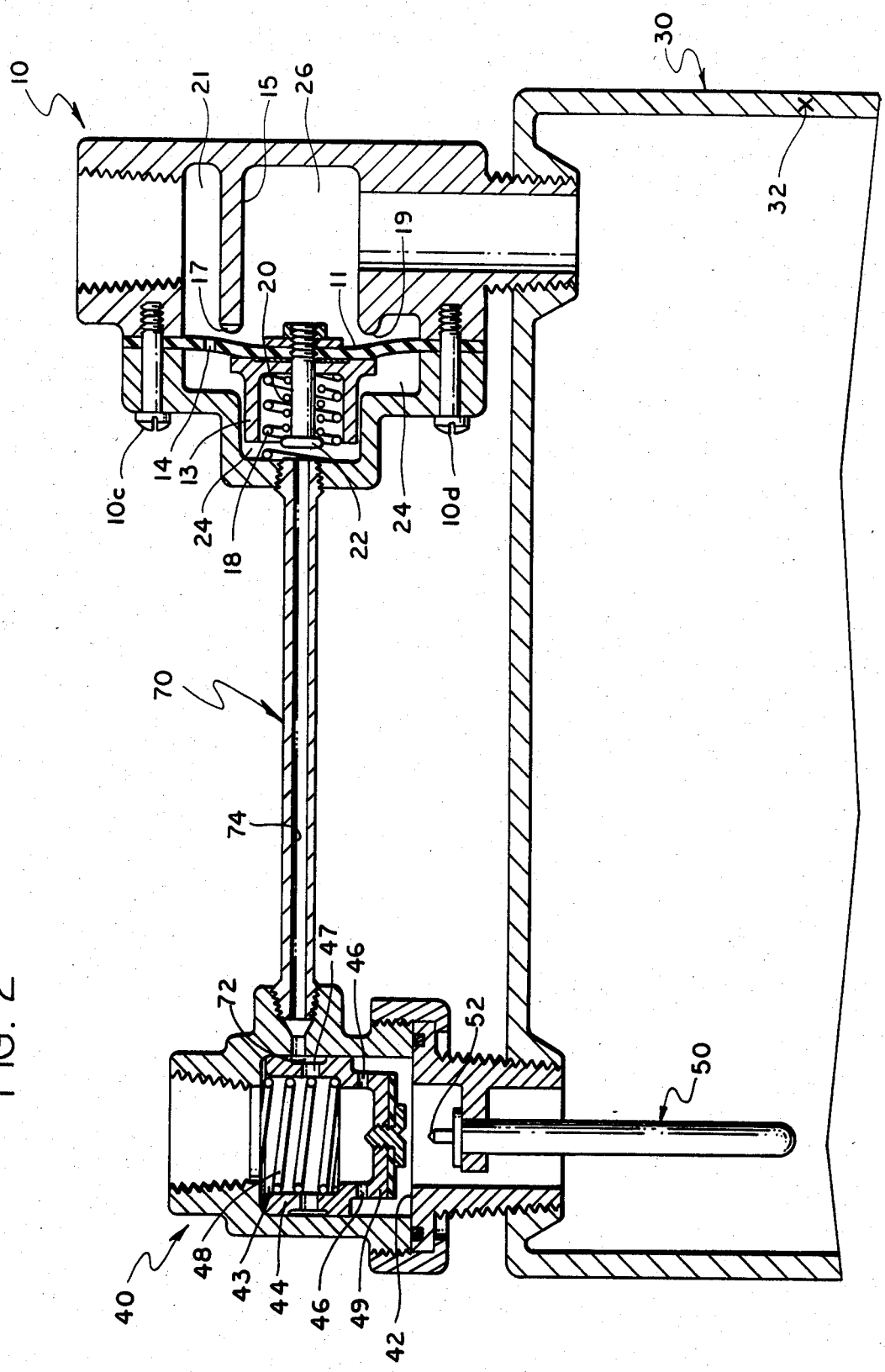
FIG. 2 is a schematic view of the structure shown in FIG. 1 illustrating the check valve and control valve is the open position.

FIG. 1 shows the present invention with the control valve closed and the check valve closed. The control valve 10 and the check valve 40 are threadably attached to the hot water tank 30 at the threaded openings 28 and 45 respectively. The connecting line 70 is attached to the check valve housing 40 and the control valve housing 10 at the threaded openings 76 and 78 respectively. The control valve 10 includes a diaphragm 11 secured between housing portions 10a and 10b which are secured together by fastener means such as bolts 10c and 10d. The diaphragm with the housing portions defines chambers 21, 24 and 26. Spring means 18 secured between housing portion 10b and valve body 13 urges the diaphragm 11 into engagement with a valve seat 19. Initially, when the system is first installed, the pressurized cold water from a source such as a municipal supply system causes the pressure in chamber 21, with a household hot water faucet open, to be greater than the pressure in chamber 24 which would be at ambient. This differential pressure moves the diaphragm 11 away from the valve seat 19 against the force of the spring 18. The rib 15 forming a part of the seat 19 incorporates an orifice 17 of unique design for allowing makeup of the water volume loss in the tank 30 during a water cooling cycle. This unique design prevents clogging that would occur using a conventional orifice of extremely small size. When the control valve is opened, the orifice or notch 17 is "washed" by the cold water flow across the rib 15. The cold water would flow from the source thereof through chamber 21 and chamber 26 into the hot water tank 30 until the tank is filled. Thus, the control valve would be in a position such as shown in FIG. 2. Assuming the household user's faucet is closed, the water would then enter the check valve 40. The water then urges the valve body 49 away from the valve seat 42 allowing the water to flow through the openings 46 and 47 in the valve stem 44. Thus, the check valve would be in a position such as shown in FIG. 2. Since the household user's faucet is closed, the water would fill chamber 43 thereby equalizing the pressure on each side of the valve stem 44. After this occurs, the force exerted by spring 48 forces the valve body 49 toward the valve seat 42 therefore, closing the check valve. The pressurized cold water also flows through conduit 74 thereby filling chamber 24. Any residual differential pressure is equalized through the orifice 14 in the diaphragm 11. As a result, the force exerted by spring 18 urges the valve body 13 towards the valve seat 19, thereby closing the control valve. Recall that the cold water source is pressurized and therefore the source pressure is greater than ambient pressure. Also, the hot water tank is pressurized and, therefore, the tank pressure is greater than ambient pressure.

Assume that the household user faucet is now opened. The pressure in chamber 43 drops below the pressure of the cold water source. Therefore, the tank pressure would be greater than the pressure in chamber 43. This drop in pressure causes the valve body 49 to disengage from the valve seat 42 allowing the hot water to flow through the openings 46 into the domestic system. As the check valve is opened, port 72 is also opened. Therefore, the pressure in conduit 74 drops to approximately the same pressure as in chamber 43. If the pressure in conduit 74 drops the pressure in chamber 24 also drops accordingly. Thus the pressure in chamber 21 is greater than the pressure in chamber 24 causing the diaphragm 11 and control valve body 13 to move away from the valve seat 19 allowing cold water to enter the hot water tank. Therefore, the check valve and control valve are both opened as shown in FIG. 2. Thus, in normal operation the opening of the check valve also opens the port 72 which then allows communications between the check valve and control valve and, since the pressure in chamber 43 drops the pressure in chamber 24 drops allowing the control valve to open. When the household user's faucet is closed, the check valve and control valve each close in the same manner as described above with regard to filling the tank.

Figure 3:
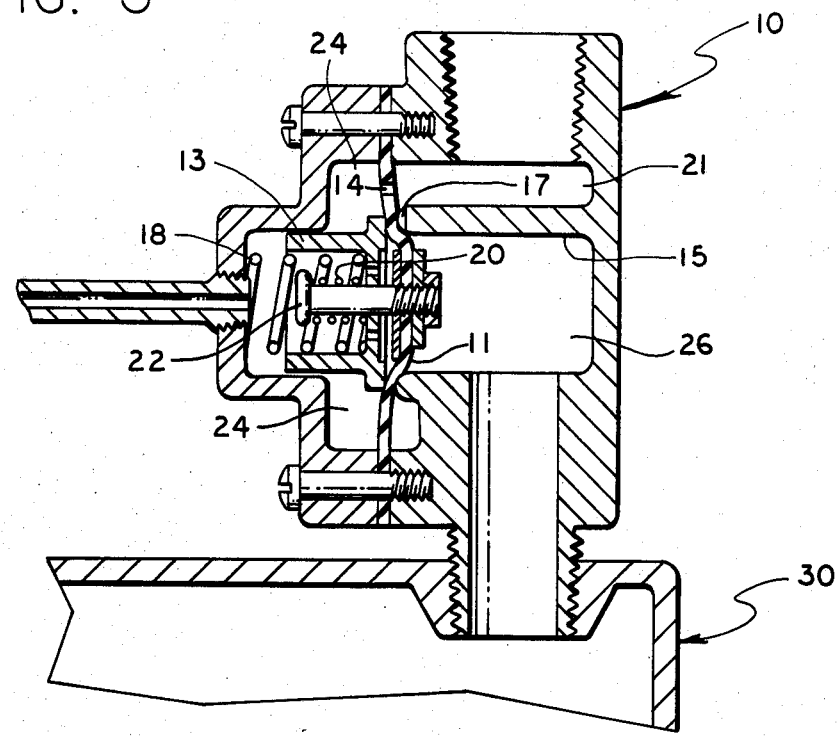
FIG. 3 is a partial schematic view of the structure shown in FIG. 1 illustrating the control valve completely closed when a leak or rupture occurs in the hot water tank.

Assume a significant leak or rupture occurs in the hot water tank 30 at point 32. The pressure in the hot water tank would thus drop to ambient pressure. Since the pressure in chamber 24 is equal to the source pressure which is greater than ambient pressure, the poppet 22 and diaphragm 11 would be urged further against the valve seat 19 therefore, when a differential pressure determined by spring 20 is reached, completely closing orifice 17. FIG. 3 shows how the control valve would look when a leak has occurred. Also, when the household user's faucet is opened, the pressure in chamber 43 would drop to ambient pressure. However, since the tank pressure is also ambient pressure the force of the spring 48 would keep the check valve closed. Therefore, port 72 would be closed, thus not allowing communication between the check valve and control valve. Therefore, the cold water is completely isolated from the hot water tank and the water within the tank is not allowed to enter the domestic system when household demands occur. Such an event functions as a hot water heater failure signal to the user.

Figure 4:
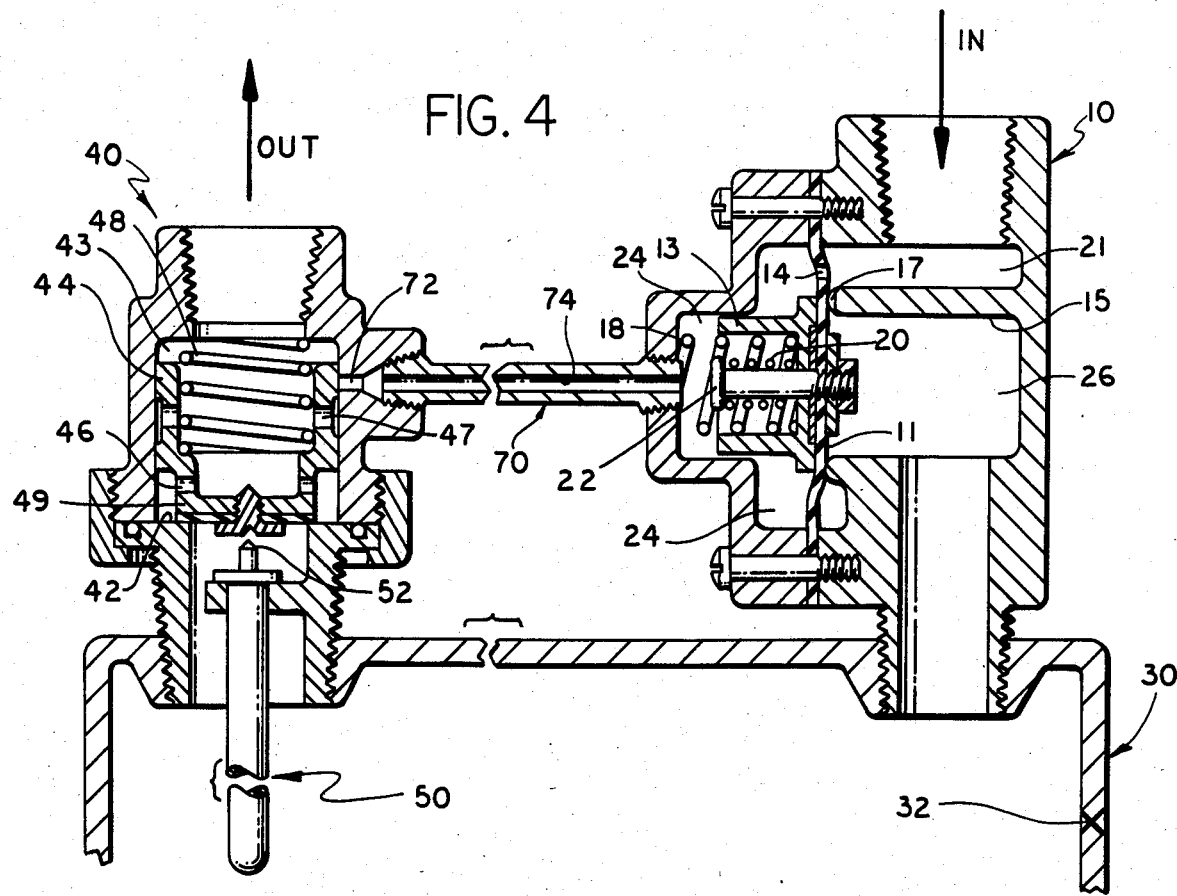
FIG. 4 is a schematic view in cross section of another embodiment of the present invention illustrating a structure of the check valve such that the communication between the check valve and control valve through the connecting line is always open.

If it is desired for the check valve and control valve to open when household demand occurs and there is a leak in the tank, the valve stem 44 could be constructed as shown in FIG. 4. The port 72 in FIG. 4 is always open. Therefore, there will always be communication between the check valve and control valve. Suppose there is a leak at point 32 and the control valve closes and the check valve closes as previously described. However, when the household user's faucet is opened the pressure in chamber 43 drops and since port 72 is open, the pressure in conduit 74 drops, therefore causing the pressure in chamber 24 to drop. This then causes the pressure in chamber 21 to be greater than the pressure in chamber 24 therefore opening the control valve and letting cold water into the hot water tank.

Figure 5:
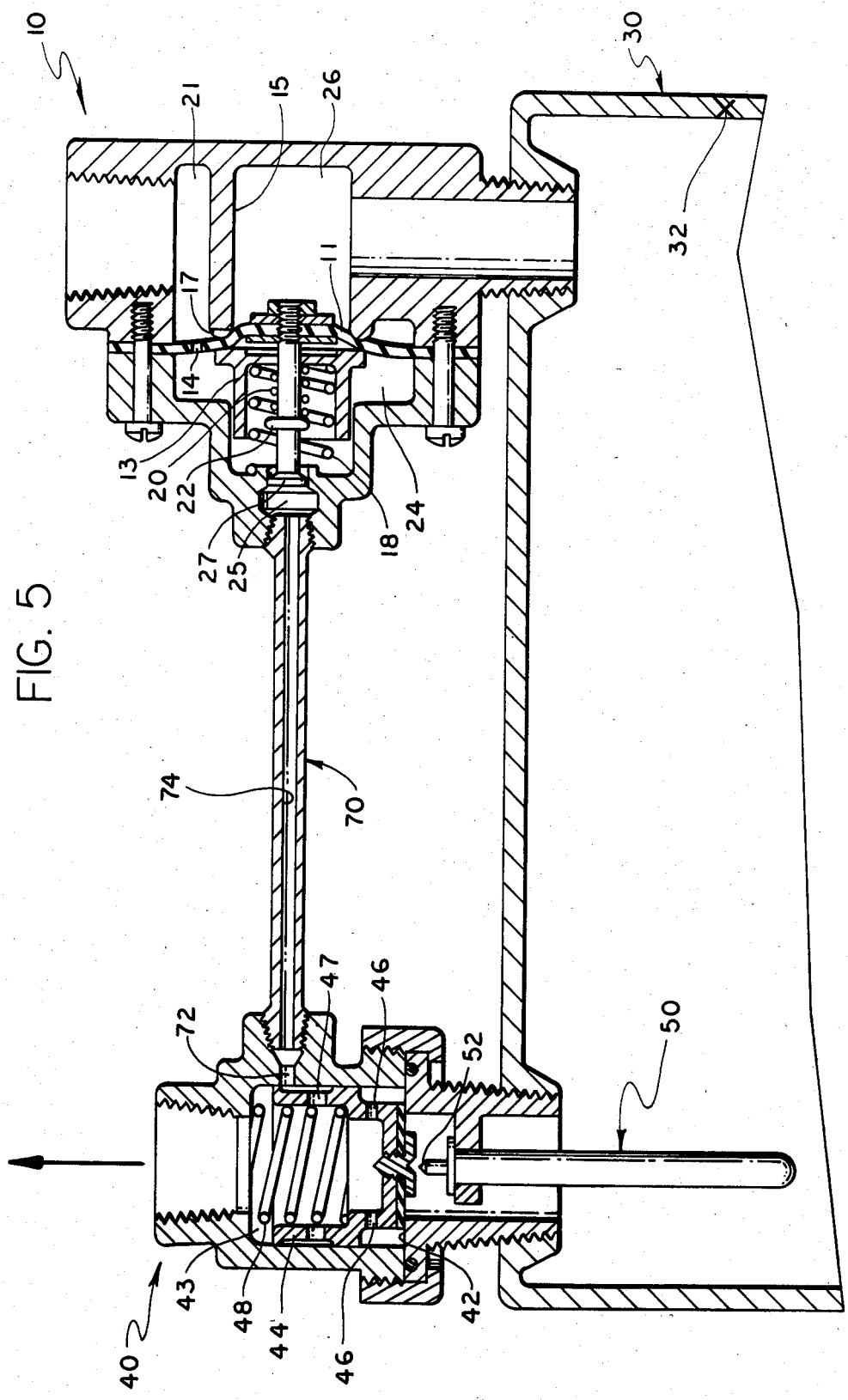
FIG. 5 is a schematic view in cross section of another embodiment of the present invention with the check valve structure in FIG. 4 and a control valve structure such that the communication through the connecting line is closed when the control valve is completely closed and pressure in the tank has reached ambient as a result of a leak occurring.

FIG. 5 illustrates another method to prevent hot water from exiting the tank when there is a leak in the tank and household demand occurs. The control valve 10 further includes a chamber 25 and a poppet 27. The poppet 27 closes the connecting line 74 only when the orifice or notch 17 is completely closed as shown in FIG. 5. This would only occur if the pressure in chamber 26 was less than the pressure in chamber 24, which only occurs under static conditions, when there is a leak in the hot water tank. When there is not a leak in the hot water tank the orifice or notch 17 is not completely closed therefore the force of the spring 20 would urge the poppet 27 into chamber 25 therefore allowing the connecting line to remain open. In normal operation when the household faucet is opened the pressure in chamber 43 and conduit 74 drops to a predetermined value less than the pressure in chambers 21 and 26. Since the poppet 27 is within chamber 25 the pressure in chamber 24 drops to a value determined by spring 18 allowing the control valve to open. Also, since the pressure in chamber 43 drops, the tank pressure is greater than the pressure in chamber 43 therefore opening the check valve. When the household users faucet is closed the pressure in chamber 43, in addition to the force of spring 48, will close the check valve. The cold water will then pass through the orifice 14 allowing the pressure in chamber 24 to equalize so that the force of spring 18 closes the control valve. After the control valve is closed, the cold water will continue to pass through orifice 14 to equalize any differential pressure between chambers 24, 26 and 21. Since port 72 remains open, conduit 74 and chamber 43 will also equalize to the pressure in chamber 21.

The present invention also incorporates a thermal element 50 to allow cold water to enter the hot water tank when an excessive temperature is reached within the hot water tank. Referring to FIG. 1, assuming there is no leak in the tank and the household user faucet is closed, recall the pressure in chamber 43 is less than the pressure in conduit 74 which is equal to the pressure in chamber 24 and chamber 21. When an excessive temperature or predetermined temperature is reached the thermal element tip 52 moves upwardly as viewed in FIGS. 1 and 2 to engage the bottom of the check valve body 49 and force the check valve open. This then opens port 72, therefore the pressure in conduit 74 would drop to equalize the chamber 43. This would cause the pressure in chamber 24 to also drop, therefore the pressure in chamber 21 would be greater than the pressure in chamber 24 thus opening the control valve and allowing cold water to enter the hot water tank. This would in turn force hot water out of the tank through opening 46 and into chamber 43 out into an overflow drain (not shown). As more cold water enters the hot water tank the temperature within the tank drops, therefore the thermal element tip 52 disengages from the check valve body 49 allowing the force of the spring 48 to close the check valve. Port 72 is then closed therefore allowing the pressure to equalize in conduit 74 and chamber 24 with chamber 21 therefore closing the control valve.

If the check valve stem 44 is structured such that the port 72 remains always open the thermal element will work as follows. Again, assume there is no leak in the hot water tank and the household user faucet is closed. Since port 72 remains open the pressure in chambers 43, 24 and 21 are equal. Also, the tank pressure is less than the pressure in chambers 43, 24 and 21. If the temperature within the water tank exceeds a predetermined amount the thermal element tip 52 engages the check valve body 49 thereby opening the check valve. Through the openings 46, the pressure in chamber 43 would drop to equalize the pressure in the tank, therefore the pressure in conduit 74 and chamber 24 also drops. This causes the pressure in chamber 21 to be greater than the pressure in chamber 24 opening the control valve allowing cold water to enter the hot water tank. This forces hot water from the tank into the check valve and into an overflow drain (not shown). As more cold water enters the hot water tank the temperature drops. Therefore, the thermal element tip 52 disengages from the check valve body 49 allowing the check valve to close. The cold water then passes through orifice 14 to allow the pressure in chambers 24 and 43 and conduit 74 to equalize.

The present invention completely isolates the cold water source from the hot water tank when a leak or rupture occurs and allows for the prevention of hot water exiting the tank when a leak or rupture occurs. The form described is merely a preferred or exemplary embodiment and it is apparent that various changes may be made by those skilled in the art without departing from the spirit and scope of the invention.

In applications where other means are provided for excessive temperature relief the thermal element 50 and tip 52 could be deleted thus permitting appropriate simplifications of the check valve.

What is claimed is:

1. A fluid system coupled to a source of fluid under pressure and a storage tank, comprising:
   a delivery system which said storage tank provides fluid to;
   control valve means connected between said fluid source and said storage tank for allowing the passage of fluid from said fluid source system to said storage tank when in an open position and preventing the passage of fluid from said fluid source to said storage tank when in a closed position; and
   said control valve means including means for sensing the pressure differential between the pressure at said fluid souce and the pressure at said delivery system, the sensing means moving said control valve means from said closed position to said open position when the fluid source pressure is greater than the delivery system pressure.

2. The system as defined in claim 1 further comprising:
   check valve means connected to said storage tank and said delivery system for allowing the passage of fluid from said storage tank to said delivery system and to limit reverse flow therebetween.

3. A fluid system coupled to a source of fluid under pressure and a storage tank, comprising:

a delivery system which said storage tank provides fluid to;

control valve means connected between said fluid source and said storage tank, said control valve means including a means for sensing the pressure differential between the pressure at said fluid source and the pressure at said delivery system whereby said control valve means opens to conduct fluid from said fluid source to said storage tank when said sensing means senses said pressure differential being at a predetermined level;

check valve means connected to said storage tank and said delivery system for allowing the passage of fluid from said storage tank to said delivery system and to limit reverse flow therebetween;

said control valve means further comprising a first unitary housing;

said first unitary housing defining a first valve seat and a pressure chamber;

said control valve means further comprising a first valve body;

said sensing means comprising a mechanical sensing structure which is attached to said first valve body such that said mechanical sensing structure engages said first valve seat when waid control valve means is closed; and said mechanical sensing structure separates said pressure chamber into at least two pressure chambers.

4. The system as defined in claim 3, wherein;

said check valve means comprises a second unitary housing;

said second unitary housing further defines a second valve seat; and said check valve means further comprises a second valve body having a valve head and a valve stem whereby said valve head is engageable with said second valve seat.

5. The system as defined in claim 4, wherein said sensing means further comprises:

a connecting line coupled between said first unitary housing and said second unitary housing for transmitting said delivery system pressure to said first unitary housing.

6. The system as defined in claim 5 wherein said mechanical sensing structure includes:

an equalizing means for equalizing pressure on both sides of said mechanical sensing structure.

7. The system as defined in claim 6 further comprising:

thermal means for allowing passage of fluid from said fluid source to said storage tank when a predetermined temperature is exceeded in said storage tank.

8. The system as defined in claim 7, wherein:

said storage tank comprises a domestic hot water heater; and said fluid source system comprises a cold water source system.

9. The system as defined in claim 7 wherein said check valve means further comprises:

means for preventing passage of fluid from said storage tank to said delivery system by not allowing said valve head of said second valve body to disengage from said second valve seat when a leak or rupture occurs in said storage tank.

10. The system as defined in claim 8, wherein:

said mechanical sensing structure comprises a flexible diaphragm; and said equalizing means comprises an orifice to equalize cold water source pressure on both sides of said flexible diaphragm.

11. The system as defined in claim 10, wherein:

said first valve seat includes a notch for allowing make up of water volume loss in the tank during a cooling cycle;

said notch prevents clogging by allowing a flow of cold water across said first valve seat each time said control valve opens;

said first valve body further comprises a first poppet disposed centrally through said first valve body; and said first poppet is attached to said flexible diaphragm and completely closing said notch when a leak or rupture occurs in said hot water heater.

12. The system as defined in claim 11, wherein said check valve means further comprises:

said thermal means comprises a thermal element; and said thermal element engages said valve head of said second valve body urging said second valve body away from said second valve seat when a predetermined temperature is exceeded in said hot water heater.

13. The system as defined in claim 12 wherein said check valve means further comprises:

preventing means for preventing passage of fluid from said hot water heater to said delivery system by not allowing said valve head of said second valve body to disengage from said second valve seat when a leak or rupture occurs in said hot water heater.

14. The system as defined in claim 13 wherein said preventing means comprises:

a port disposed at the end of said connecting line which is attached to said second unitary housing; and said valve stem of said second valve body structured such that said port is closed when said valve head of said second valve body is seated against said second valve seat, and is open when said valve head of said second valve body disengages said second valve seat.

15. The system as defined in claim 13 wherein said preventing means comprises:

a second poppet attached to said first poppet such that said connecting line is closed from said first unitary housing when a leak or rupture occurs in said hot water heater and is open otherwise.

16. The system as defined in claim 12, wherein:

a port is disposed at the end of said connecting line which is attached to said second unitary housing; and said second valve stem is structured such that said port is always open.

* * * * *